United States Patent
Gazuit

[11] 3,809,423
[45] May 7, 1974

[54] LOADER FOR TIRE CURING PRESS
[76] Inventor: Georges Gazuit, Chem Chauveau 03, Montlucon, France
[22] Filed: Apr. 16, 1973
[21] Appl. No.: 351,524

[52] U.S. Cl............... 294/88, 294/93, 294/97
[51] Int. Cl. .............................. B66c 1/22
[58] Field of Search............ 294/67 R, 67 B, 67 BC, 294/86 R, 88, 93, 95, 97; 214/1 R, 1 B, 1 BC; 425/32, 36, 38, 43

[56] References Cited
UNITED STATES PATENTS

| | | | |
|---|---|---|---|
| 2,508,246 | 5/1950 | Gerstenslager | 294/97 X |
| 2,857,194 | 10/1958 | Brown | 294/86 R |
| 2,997,738 | 8/1961 | Soderquist | 294/93 X |
| 3,033,605 | 5/1962 | Morrow | 294/97 |
| 3,128,118 | 4/1964 | Ezzell | 294/97 |
| 3,400,967 | 9/1968 | Heller et al. | 294/93 |

Primary Examiner—Evon C. Blunk
Assistant Examiner—Johnny D. Cherry
Attorney, Agent, or Firm—Amster & Rothstein

[57] ABSTRACT

This invention relates in general to loaders for tire curing presses, of the type comprising means for supplying the press mould with a crude tire to be vulcanized, and has specific reference to an improved loader of this character.

The loader comprises essentially a main frame structure 1, an auxiliary frame 2 adapted to travel vertically in relation to said main frame, a plurality of segments 3 disposed on a circle and movable radially from an operative position to a release or clearing position, means 4 for moving said segments from their operative position to their release position, and vice versa, gripping means 5 movable vertically on each segment and other means 6 for driving said gripping means vertically along said segments.

9 Claims, 10 Drawing Figures

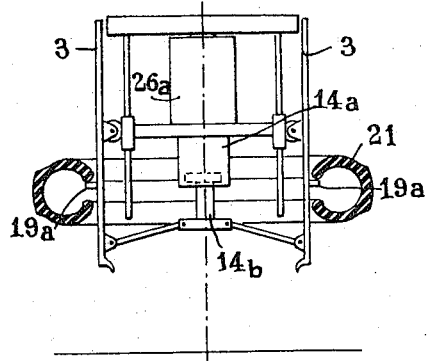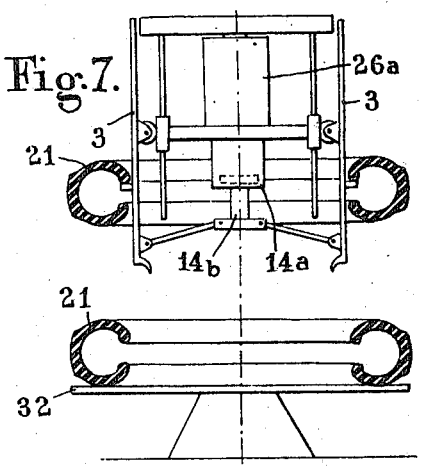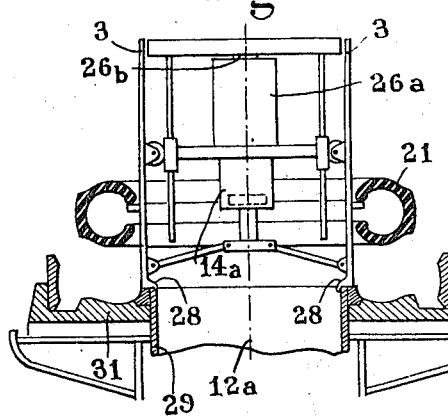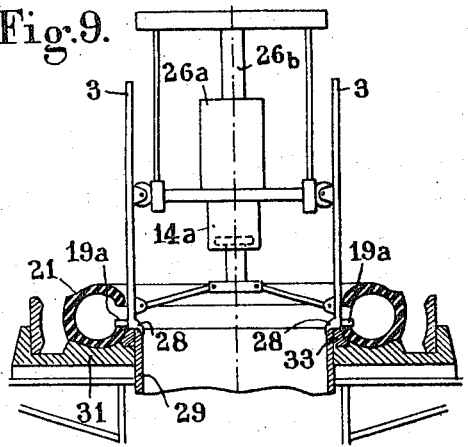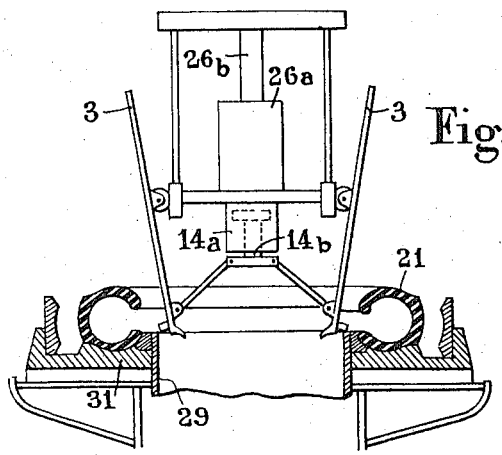

LOADER FOR TIRE CURING PRESS

FIELD OF THE INVENTION

This invention relates in general to loaders for tire curing presses, of the type comprising means for supplying the press mould with a crude tire to be vulcanized, and has specific reference to an improved loader of this character.

BACKGROUND OF THE INVENTION

Hitherto known loaders for tire curing presses comprise as a rule a main frame structure, an auxiliary frame adapted to travel vertically in relation to said main frame structure with the assistance of suitable drive means, and a plurality of gripping members in the form of arms extending substantially vertically, carried by said auxiliary frame, disposed on a circle and radially movable under the control of suitable drive means from a release position in which all the arms are gathered centrally of said circle and an operative position in which said arms are adapted to pick up a crude tire to be vulcanized, laid flat on a suitable support, by engaging its upper bead. The main frame structure of the loader is generally secured to the upper cross member of the curing press which is movable at least horizontally in a transverse direction from a first position in which it lies plumb to the lower portion of the press mould while the loader proper is positioned on one side of the press for receiving a crude tire to be vulcanized and another position permitting the unloading of the freshly vulcanized tire from the press, said loader when in said other position being plumb to the lower portion of the mould so that it can introduce a crude tire into said mould portion. Loaders of the known type broadly described hereinabove are not self-centering with respect to the lower portion of the press mould and their function consists simply in depositing the crude tire without any accurate centering thereof in relation to the lower portion of the press mould.

SUMMARY OF THE INVENTION

It is the essential object of the present invention to avoid these inconveniences by providing a loader capable of centering both itself and a crude tire to be vulcanized with respect to the lower portion of the mould of a curing press.

To this end, the loader according to this invention, which comprises a main frame structure, an auxiliary frame vertically movable in relation to said main frame structure, means for vertically moving said auxiliary frame in relation to said main frame structure, is characterized in that it further comprises a plurality of substantially vertical segments disposed on a circle and connected to said auxiliary frame, each segment having a cylindrical outer surface and being movable in a radial direction in relation to the cylinder in which its outer surface is inscribed, between an operative position in which the outer cylindrical surfaces of all the segments are located in a common cylindrical surface having the diameter of the central opening of a crude tire to be vulcanized and a release or clearing position in which at least the lower ends of said segments lie inside said cylindrical surface, means for moving said segments from their operative position to their release or clearing position and vice-versa, vertically movable gripping means on each segment and means for driving said gripping means vertically along said segments.

With this arrangement, it is advantageously possible to so shape the lower ends of said segments that the segments be self-centering in relation to the lower portion of the press mould when they are in their operative position and the loader is lowered towards said mould portion for depositing the crude tire to be vulcanized into said mould portion. Moreover, after the lower portions of said segments have been centered in relation to the lower mould portion said gripping members can be utilized for positioning the lower bead of the crude tire about a centering ring usually provided in the lower portion of the press mould, in order to ensure an accurate centering of the crude tire in relation to said lower portion of the mould.

BRIEF DESCRIPTION OF THE DRAWINGS

A detailed description of a preferred form of embodiment of this invention will now be given by way of example with reference to the attached drawings in which.

DESCRIPTION OF THE PREFERRED EMBODIMENT

Figure 1:
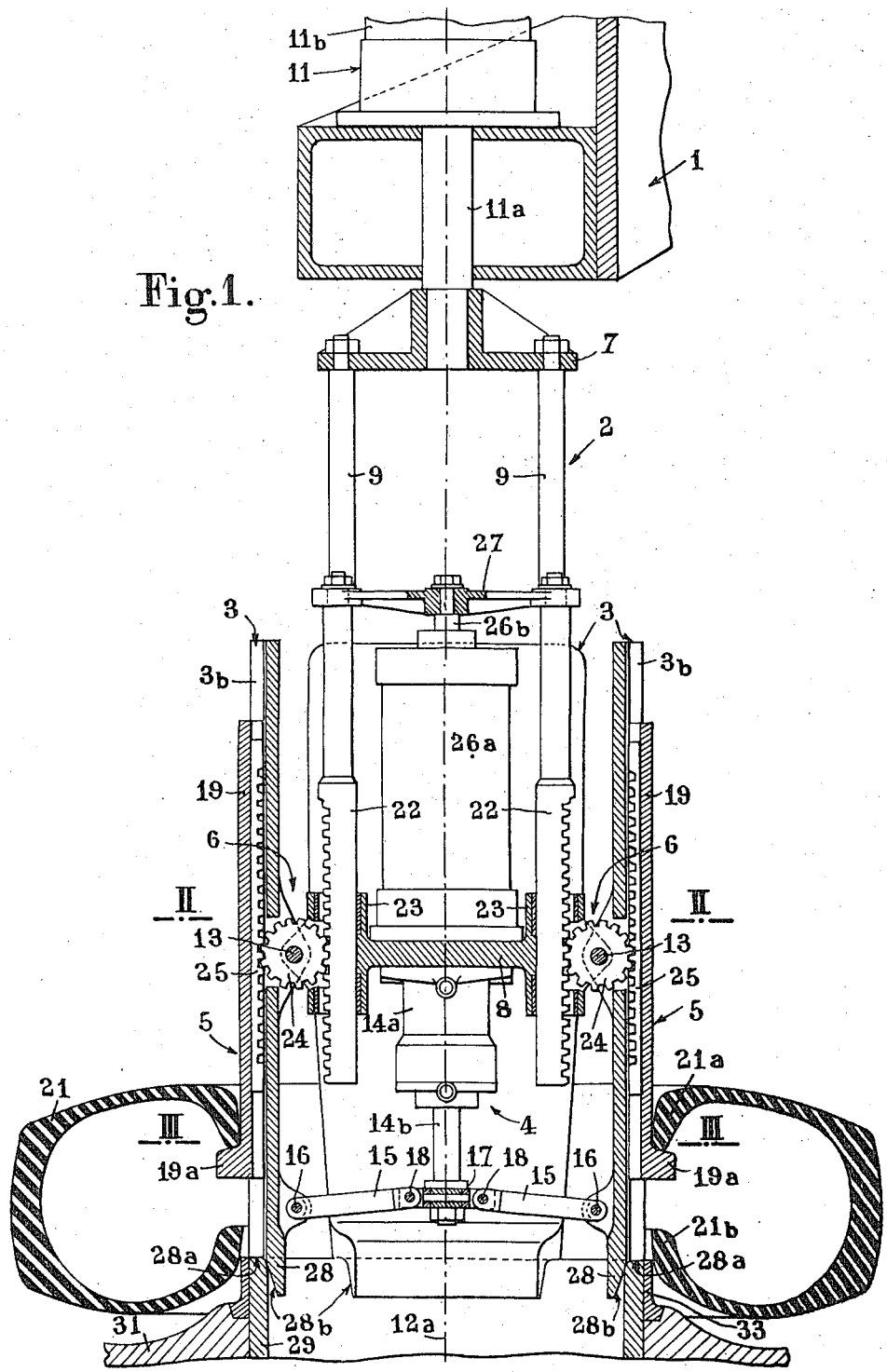
FIG. 1 is a vertical section illustrating a loader according to this invention.
Figure 2:
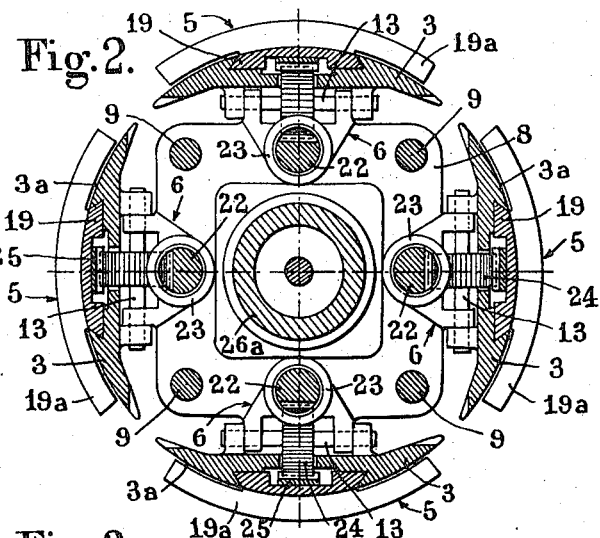
FIGS. 2 and 3 are horizontal sections taken along the lines II—II and III—III, respectively, of FIG. 1, and FIGS. 4 to 10 are diagrammatic views illustrating the positions assumed by some of the component elements of the loader during the successive steps of its operation.
Figure 3:
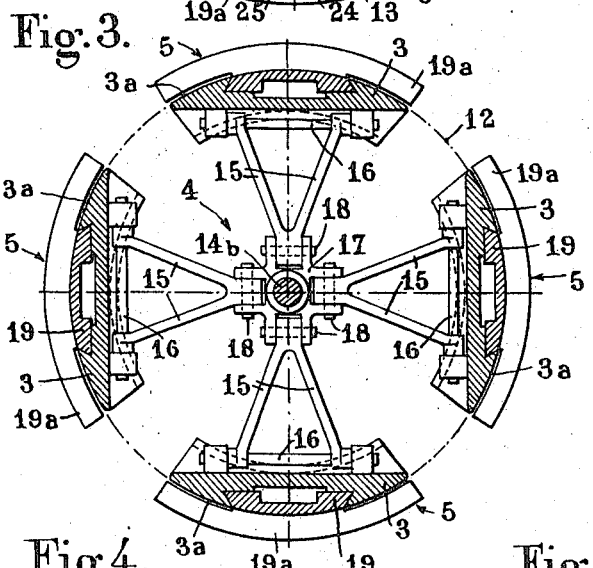
Figure 4:
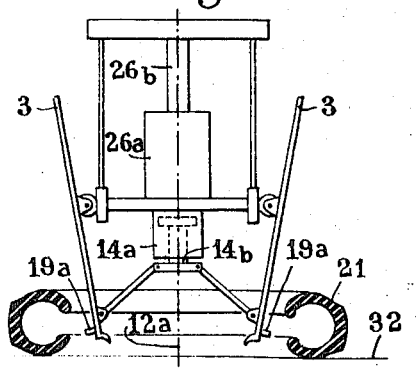
Figure 5:
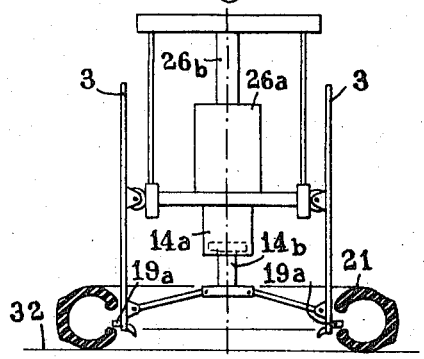

Referring first to FIGS. 1 – 3 of the drawings, it will be seen that the loader according to this invention comprises essentially a main frame structure 1, an auxiliary frame 2 adapted to travel vertically in relation to said main frame structure 1 and, according to a specific feature characterizing this invention, a plurality of segments 3 (which are four in number in the exemplary form of embodiment of the invention illustrated in the drawings) disposed on a circle and movable radially from an operative position to a release or clearing position to be described more in detail presently, means 4 for moving said segments from their operative position to their release position, and vice versa, gripping means 5 movable vertically on each segment and other means 6 for driving said gripping means vertically along said segments.

The loader according to this invention is intended more particularly for equipping a tire curing press comprising a movable upper horizontal cross member, adapted to travel at least horizontally in relation to itself from a first position in which it is plumb with the lower portion of the mould of the curing press and another position in which it is somewhat spaced from the first position to permit the unloading of the previously cured tire and the introduction and positioning of a crude tire to be vulcanized into said mould. The above reference to the mobility of the upper cross member of the press "at least horizontally" means that this cross member may also be moved vertically in relation to itself as in certain known presses for closing the press mould; of course, the loader of this invention is also adapted to be used efficiently in these known presses. Under these conditions, the main frame structure 1 may consist for instance of an arm secured at one end to the upper horizontal cross member of the press so as to extend across said cross member (not shown). The length of the arm constituting the main frame structure 1 must be such that, when the aforesaid cross member is in the first or operative position mentioned hereinabove the loader is disposed on one side of the press so that it can pick up a crude tire to be vulcanized and that, when said cross member is in its other position mentioned hereinabove, the loader is plumb to the lower portion of the press mould.

The auxiliary frame 2 consists of a pair of upper and lower horizontal plates 7, 8 respectively, braced by four vertical parallel columns 9. The upper plate 7 is secured to the lower end of the piston rod 11a of a double-acting actuator 11 of which the vertical cylinder 11b is secured to the main frame structure 1. This actuator 11 is connected to a source of fluid under pressure (not shown) and adapted to move said auxiliary frame 2 vertically in relation to the main frame structure 1.

Each segment 3 has a part-cylindrical outer surface 3a such that when all the segments 3 are in their operative positions as shown in FIG. 1 their outer surfaces 3a merge into a common cylindrical surface 12 (FIG. 3) having the same diameter as the central opening of a crude tire to be vulcanized. Moreover, each segment 3 has a vertical plane of symmetry passing through the axis 12a of the aforesaid cylindrical surface 12, as clearly shown in FIGS. 2 and 3, and furthermore each segment 3 is pivoted to the auxiliary frame 2, i.e., more particularly to the lower plate 8 thereof, about a horizontal pivot pin 13 perpendicular to the vertical plane of symmetry of the segment, said pivot pin 13 being located substantially at mid-height of said segment.

The means for moving the segments 3 from their operative positions to their release positions comprise an actuator having its cylinder 14a secured to the bottom of the lower plate 8 of the auxiliary frame so that its piston-rod 14b extends coaxially to the vertical axis 12a (FIG. 1) of the above-defined cylindrical surface 12, and links 15 having each one end pivoted to a corresponding segment 3 by means of a pivot pin 16 and the other end pivoted to a relevant strap of a socket 17 secured to the lower end of piston rod 14b, by means of a pivot pin 18. As shown in FIG. 3, each link 15 is preferably in the form of a wishbone and the cylinder 14a of the corresponding actuator is connected to a source of fluid under pressure (not shown). With this arrangement, when the actuator 14a, 14b is supplied with fluid under pressure in the direction to move the piston-rod 14b outwards, the segments 3 are brought to their operative positions illustrated in FIG. 1, and when the actuator is operated in the direction to retract the piston-rod, the segments 3 pivot about their pivot pins 13 and assume their so-called release or clearing positions in which their lower ends lie inside the above-defined cylindrical surface 12.

The gripping means 5 consist for each segment of a dovetail-sectioned slide 19 slidably engaged in a corresponding vertical slideway 3b of corresponding cross-sectional contour formed in the part-cylindrical outer surface of the segment. The outer surface of said slide 19 is flush with that of the relevant segment and has the same curvature. At its lower end, each slide 19 comprises a projecting portion 19a extending horizontally along a circular arc of a length corresponding substantially to the width of the segment associated therewith. These projecting portions 19a of slides 19 constitute the gripping means proper and are adapted to lift from underneath the upper bead 21a of a tire 21 laid flat as shown notably in FIG. 1.

The means 6 for driving these gripping means comprise for each segment a first rack 22 adapted to slide vertically in a socket 23 rigid with the lower plate 8 of the auxiliary frame 2, said rack 22 being in constant meshing engagement with a pinion 24 rotatably mounted on the horizontal pivot pin 13 of segment 3; this pinion 24 is also in constant meshing engagement with another rack 25 rigidly secured to the slide 19. An actuator 26a–26b is adapted to drive simultaneously all the racks 22 in the vertical direction. To this end, the cylinder 26a of this actuator, which is connected to a source of fluid under pressure of suitable type (not shown), is secured to the lower plate 8 of the auxiliary frame 2 in such a manner that its piston rod 26b extends coaxially to the vertical axis 12a and a spider 27 rigid with the end of said piston rod 26b connects the latter to the upper ends of racks 22. With this arrangement, when the actuator 26a–26b is supplied with pressure fluid in the direction to drive its piston rod 26b downwards, so that the racks 22 are moved upwards, the slides 19 and their projections 19a are moved downwards; in contrast thereto, when said actuator 26a, 26b is actuated in the direction to retract its piston rod, the racks 22 move downwards and the slides 19 upwards, so that their projections 19a are also driven upwards.

On the other hand, each segment 3 comprises 2 shoulder 28 at its lower portion. Each shoulder 28 comprises a front bearing surface 28a facing downwards and adapted to engage the top edge of the well of the curing press, as shown in FIG. 1, and another surface 28b of frustoconical configuration having its minor base at the bottom, the diameter of the major base of this frustoconical portion being substantially equal to the inner diameter of the press well 29. The frustoconical surfaces 28b of the shoulders 28 of the four segments 3 constitute combined means adapted to centre the segments 3 in relation to the well 29 and, consequently, in relation to the lower flange 31 of the mould of the curing press when said segments 3 are in their operative positions and the loader is lowered towards said lower flange 31 by means of the main actuator 11 (FIG. 1).

Now reference will be made to FIGS. 4 to 10 of the drawings to describe the mode of operation of the above-described loader for supplying a crude tire to the mould of a curing press. Although this has been omitted from FIGS. 4 to 10, it will be assumed that the loader is supported by an arm 1 rigid with the upper cross member, mounted for horizontal movement, in a tire curing press as mentioned hereinabove with reference to FIG. 1, and that the auxiliary frame can be moved vertically by means of an actuator such as 11 shown in FIG. 1 but not in FIGS. 4 to 10. It will further be assumed that a crude tire 21 to be vulcanized has been laid flat upon a table 32, beneath the loader, so that the tire axis be substantially coincident with the vertical axis 12a of the loader. Then the actuator 14a–14b is energized to bring the segments 3 to their release or clearing position shown in FIG. 4, and the actuator 11 (not shown in FIGS. 4 to 10) is also actuated in order to bring the loader to the position shown in the same FIG. 4. At this time, if the projecting portions 19a of gripping means 5 are not already in the position shown in FIG. 4, the actuator 26a, 26b is energized in order to bring them to this position, whereafter the actuator 14a, 14b is energized in turn to bring the segments 3 to the operative position illustrated in FIG. 5. Then, the actuator 26a, 26b is actuated again in order to lift the projecting portions 19a, and at the same time the top actuator 11 is energized for lifting the loader above the table 32, the assembly being then in the position shown in FIG. 6. During the time necessary for completing the vulcanization of the crude tire enclosed in the press mould, another crude tire may be deposited in a waiting position upon the table 32 as shown in FIG. 7. When the vulcanization of the tire enclosed in said mould is completed, the upper cross member of the press is moved transversely in relation to itself towards one side of the press to permit the unloading and removal of the freshly vulcanized tire; these unloading and removal operations are well known per se and therefore their detailed description is not deemed necessary. At the same time, the loader is brought above the lower flange 31 of the mould, the vertical axis 12a of the loader being then substantially coincident with the vertical axis of symmetry of the mould. The actuator 11 is then energized in order to lower the loader to the position shown in FIG. 8. During this downward movement of the loader the shoulders 28 of segments 3 ensure an acurate centering of these segments in relation to the lower flange 31. Then, the actuator 26a, 26b is operated for lowering the projecting portions 19a of the gripping means, thus lowering the crude tire 21 which, during its movement, assumes the position shown in FIG. 1. From this position, the projecting portions 19a continue to move downwards and leave the upper bead 21a of the tire for engaging its lower bead 21b and positioning same about the centering ring 33, as shown in FIG. 9. Thus, the tire 21 is properly positioned on the lower flange 31 of the mould. The projections 19a may then be slightly raised by means of the actuator 26a, 26b, and the actuator 14a, 14b is subsequently operated in order to bring the segments 3 to the position illustrated in FIG. 10. From this position, the actuator 11 can be operated for lifting the loader, and the upper cross member of the press is again moved in the opposite direction for restoring the upper portion of the mould (not shown) above the lower flange 31 thereof and at the same time the loader is brought above the table 32, and is ready for performing another press loading cycle.

As will be readily seen from the foregoing the loader according to the present invention has the twofold advantage of being capable of centering itself automatically in relation to the press well and therefore to the lower flange of the press mould, and permitting a perfectly adequate centering and positioning of the crude tire on the lower flange of the mould.

Of course, the specific form of embodiment described hereinabove is given by way of example, not of limitation; therefore, many modifications and changes may be brought thereto without departing from the basic principles of the invention. Thus, notably, the number of segments 3 may be other than four, provided that this number is at least two and preferably at least three. On the other hand, it will be noted that for carrying out this invention it is necessary that the projections 19a can move radially inand outwards so that they can be engaged into a crude tire and removed therefrom, alternatively. This result can be obtained, as explained hereinabove, by pivoting the segments 3 about horizontal pins 13 so arranged that at least the lower ends of these segments can move from an operative position as shown in FIG. 1 and a release or clearing position as shown notably in FIGS. 4 and 10. However, it will readily occur to those conversant with the art that this result could be obtained as well by moving the segments radially, parallel or substantially parallel to themselves, for example by using a parallel-motion system or the like.

What I claim is:

1. Loader intended for use in conjunction with a tire curing press for delivering a crude tire to be vulcanized to the press mould, said loader comprising a main frame structure, an auxiliary frame vertically movable in relation to said main frame structure, means for moving said auxiliary frame vertically in relation to said main frame structure, a plurality of substantially vertical arms disposed on a circle and connected to said auxiliary frame, each arm being movable in a radial direction from an operative position in which said arms are spread outwards to permit the gripping of a crude tire to be vulcanized to a release position in which at least the lower ends of said arms are retracted inwards for releasing the crude tire, means for moving said arms from their operative position to their release position and vice-versa, gripping means carried by said arms for gripping and supporting a crude tire disposed horizontally by engaging its upper bead, characterized in that said gripping means are mounted on each arm for vertical sliding movement, and that it further comprises means for moving said gripping means vertically along said arms.

2. Loader according to claim 1, characterized in that each arm consists of a segment of substantially part-cylindrical configuration having a cylindrical outer surface and that, when all the segments are in their operative position, their outer surfaces are part of a same cylindrical surface of a diameter equal to that of the circular central opening of the crude tire to be vulcanized.

3. Loader according to claim 2, characterized in that each segment has a vertical plane of symmetry passing through the axis of said cylindrical surface and is pivoted to said auxiliary frame about a horizontal axis perpendicular to said vertical plane of symmetry, said horizontal axis being positioned substantially at mid-height of the segment.

4. Loader according to claim 3, characterized in that the means for moving said segments from their operative positions to their release positions comprise an actuator having its cylinder carried by said auxiliary frame whereby its piston rod extends coaxially to the axis of said cylindrical surface, in conjunction with links pivoted at one end to the relevant segment and at the other end to the piston rod of said actuator.

5. Loader according to claim 4, characterized in that each link has substantially the shape of a wishbone.

6. Loader according to claim 3, characterized in that the aforesaid gripping means comprise for each segment a dovetail-sectioned slide adapted to slide in a vertical slideway-forming groove of corresponding cross-sectional contour, formed in the outer surface of said segment, the outer surface of said slide being flush with that of said segment and having the same curvature and at its lower end a projecting portion extending horizontally along a circular arc of a length corresponding substantially to the width of the relevant segment, said projecting portion being adapted to lift a flat-laying tire by engaging the upper bead thereof from beneath.

7. Loader according to claim 6, characterized in that said means for moving said gripping means comprise for each segment a first rack mounted for vertical sliding movement on said auxiliary frame, a pinion in constant meshing engagement with said first rack and rotatably mounted to the horizontal pivot pin on which said segment is pivoted, a second rack in constant meshing engagement with said pinion and rigidly secured to said slide, and an actuator carried by said auxiliary frame and adapted to simultaneously drive said first racks in a vertical direction.

8. Loader according to claim 1, characterized in that each segment comprises at its lower end a shoulder having a front bearing surface facing downwards and a frustoconical surface also directed downwards with its minor base at the bottom, the frustoconical surfaces of said segment shoulders constituting together means for centering the segments of the loader in relation to the lower flange of the mould of the tire curing press when said segments are in their operative positions and the loader is lowered towards said mould flange.

9. Loader according to claim 1, suitable for use in association with a tire curing press comprising a horizontal cross member movable in a horizontal plane above the frame structure of the press, characterized in that said main frame structure comprises essentially an arm adapted to be secured at one end to said cross member so as to extend across same, and that the means for controlling the vertical movements of said auxiliary frame in relation to said main frame structure comprise an actuator having its vertical cylinder secured to the free end of said arm and its piston rod secured to said auxiliary frame.

* * * * *